March 8, 1932.  P. NORBERG  1,848,541

SEAL TRAP

Filed Jan. 14, 1930

INVENTOR

PETER NORBERG his Attorney

Patented Mar. 8, 1932

1,848,541

UNITED STATES PATENT OFFICE

PETER NORBERG, OF BERNARD HARBOUR, NORTH WEST TERRITORIES, CANADA

SEAL TRAP

Application filed January 14, 1930. Serial No. 420,725.

This present invention relates to improvements in a seal trap and appertains particularly to a device of this kind intended for catching seals in the winter as they come up through the holes in the ice to breathe.

An object of the invention is to provide a trap of this kind that will be anchored to the ice and steadied in the hole through the ice in which it is located by braces frozen against the sides of the hole.

A further object of the invention is to provide an impaling trap for seals and the like adapted to be anchored and steadied in place and provided with circumferentially spaced impaling teeth designed to admit of the entrance of a part of the animal and to prevent its withdrawal or retirement.

A still further object of the invention is the provision of a trap of the nature and for the purpose set forth that is characterized by structural simplicity, durability and low cost of production whereby the same is rendered commercially desirable.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

In the drawings:—

Figure 1:
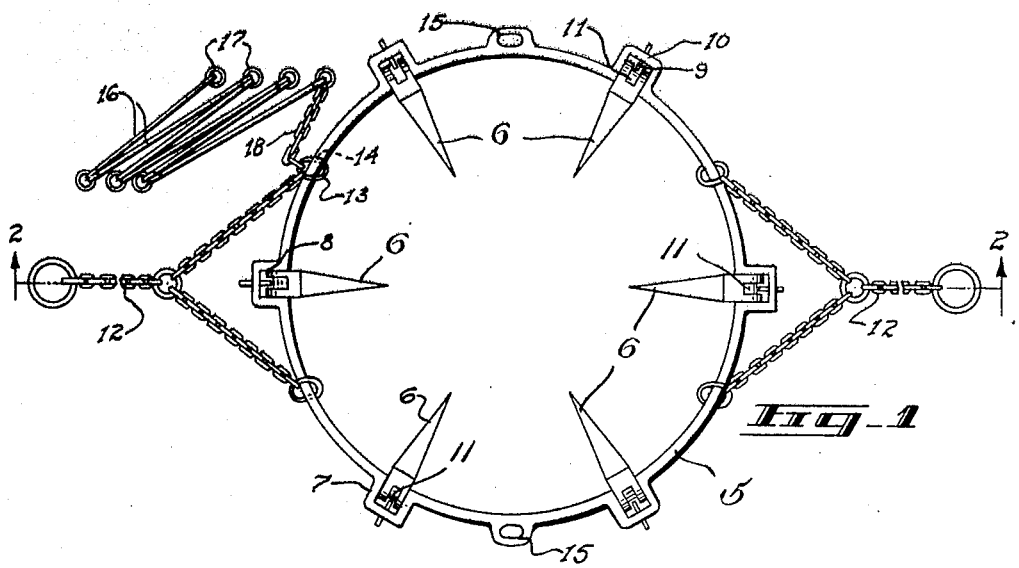
Figure 1 is a plan view of my improved trap.
Figure 2:
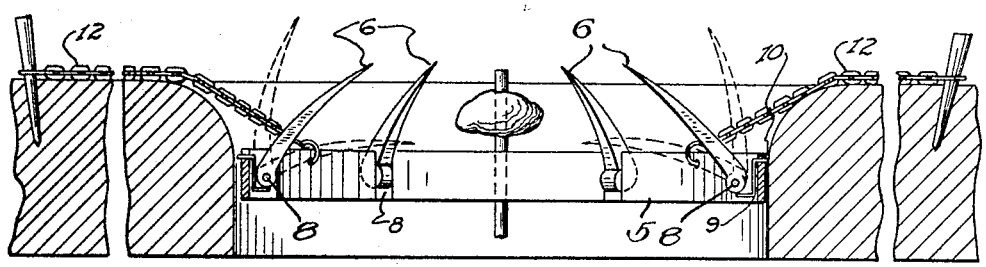
Figure 2 is a longitudinal section as taken on the line 2—2 of Figure 1.
Figure 3:
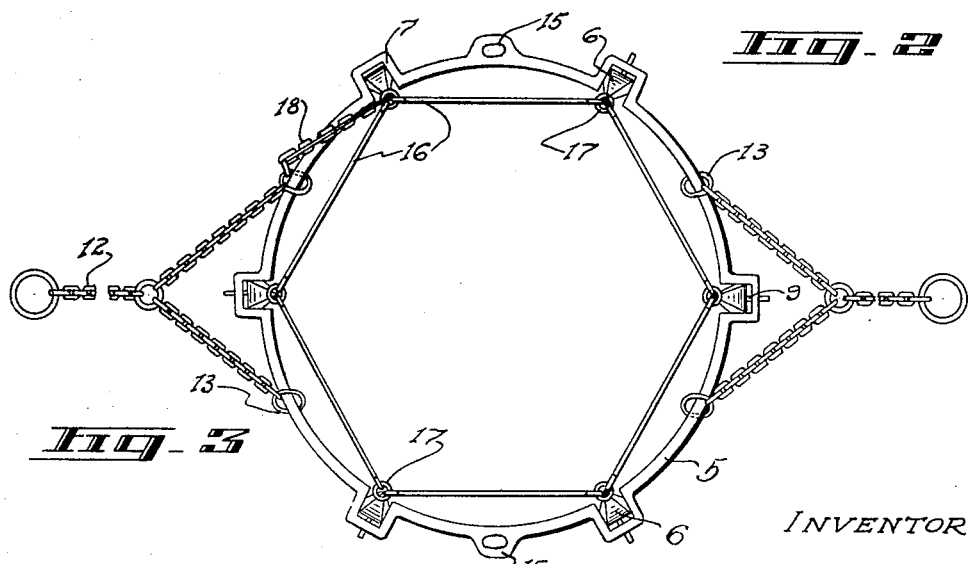
Figure 3 is a plan similar to Figure 1, but showing the impaling teeth held 'open' or 'set' by spacing rods.

As seals spend most of their time under water and yet have need of air, they are consequently forced to work hard during the coldest periods of winter to keep their breathing holes open through the ice that may be as much as five to ten feet thick. All the winter long they come to the surface through these holes as the work of keeping them open and breathing necessitates. It is in these holes, I locate my traps, about six inches under the surface of the ice; the anchoring chains are carried out over the ice and firmly secured and twigs or other stays that engage the trap are frozen with slush against the sides of the hole to hold or maintain the trap while set in the desired centered and horizontal position.

As a seal coming to the surface engages and is in turn engaged by this trap, it endeavors to sink to safety and in doing so carries the trap downwards with it as far as the trap's anchoring chains will allow and then either dies as a result of the wounds inflicted by the trap or drowns. The animal is then easily drawn to the surface and the trap reset and positioned.

The principal element in the trap is the frame 5, an annular band about a quarter inch thick and two inches deep. Radial dogs or impaling teeth 6 with sharp points at their inner ends are hingedly mounted in the recessed seats 7 spaced at intervals circumferentially about the frame band 5. As this frame band will probably be manufactured most economically as a casting, these recessed seats 7 will preferably be formed as outwardly offset concentric continuations of the ring and of the same thickness.

The dogs 6 are mounted on the seat-carried horizontal pivot pins 8 and normally stand inwardly and upwardly inclined at about 45 degrees by virtue of the action of the springs 9, shown in the illustration formed as a Z-shaped member secured to the under side of the dog at its inner end and extending upwardly to a point near the top of the recessed seat 7 and thence outwardly through a perforation 10 in the wall thereof. As the upward hinging of the dog against the spring would tend to bring the face of the dog and the vertical portion of the spring together even to a point of contact, a vertical groove 11, running longitudinally of the dog is provided to accommodate this portion of the spring when the dog shall be moved into such vertical or upright position. For ordinary use the trap frame 5 may be from ten to eighteen inches in diameter and the dogs will be of such proportion that the passage through between their points will vary, depending on their angle, from substantially the equal of the ring's diameter, when open, to a circumference of four to six inches when closed. Anchoring chains 12, forked at their inner ends to engage the trap frame 5 at two spaced places by the links 13 passing through perforations 14 in the frame wall extend from diametrically opposite sides of the trap. These are intended, as previously intimated, to be carried up over the ice and suitably secured.

At diametrically opposite points at right angles to the anchor chains, I have provided sockets in the form of vertical openings 15 through coincidental bulges in the frame 5, whose purpose is to accommodate any suitable device that may be employed as a brace to the side of the hole in the ice for steadying the trap in position.

An expedient for holding the dogs open, in the nature of links or rods or strands of stiff wire 16 with eyelets 17 connecting their ends in a chain, is provided and used by slipping the eyelets 17 over the free pointed ends of the dogs 6, the length of the links 16 as chords determining the circumference the points of the dogs shall describe when thus set. The need for setting the dogs in this manner may present itself if for any reason the springs 9 appeared too strong or if ice seemed to prevent the easy opening of the dogs so as to deter an animal from entering, the ready dislodging of the links and eyelets by the intruder allowing the impaling dogs to come into immediate action being apparent. A chain or other appropriate keeper 18 connects the string of links to the trap frame 5 to permit of retrieving it once dislodged.

From the foregoing description taken in connection with the accompanying drawings, it will be manifest that a seal trap is provided that will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying drawings and specification shall be interpreted as illustrative and not in a limitative or restrictive sense.

Having thus described my invention, what I claim as new and desire to secure by Letters Patent is:—

1. A seal trap including a continuous annular ring frame having outwardly offset portions forming seats opening into the said frame; pointed arcuate dogs pivoted at their large lower ends in said seats; an individual spring member for each of said dogs to resiliently maintain said dogs in inclined converging position; means removably resting on the pointed upper ends of said dogs to maintain them in upstanding set position; means for connecting the last mentioned means to said frame; means for securing said frame in set position in an opening through ice; and anchoring means for said frame.

2. A seal trap including a continuous annular frame with seats offset therefrom; spring held dogs pivoted in said seats and converging toward one another; spacing links connected by rings removably engaged over the pointed upper ends of said dogs to normally maintain said upper ends of the dogs in their outermost spaced position against the action of the springs for said dogs; means for connecting said links to said frame; means for securing said frame in set position in an opening through ice; and anchoring means for said frame connected with opposite sides thereof.

In testimony whereof I hereunto affix my signature.

PETER NORBERG. [L. S.]